E. H. BRISTOL & W. E. GOODYEAR.
MEASURING OR CONTROLLING INSTRUMENT.
APPLICATION FILED MAY 7, 1908.
1,060,812.
Patented May 6, 1913.
2 SHEETS—SHEET 1.
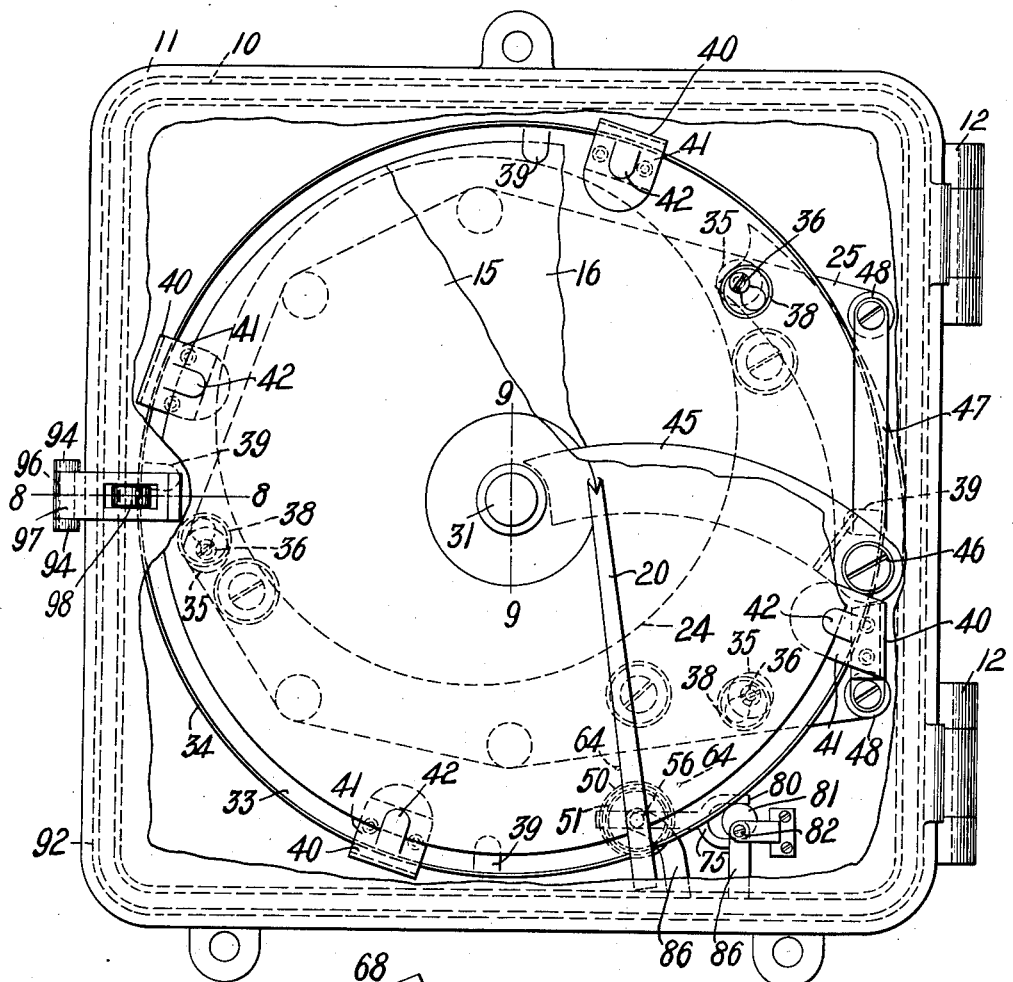
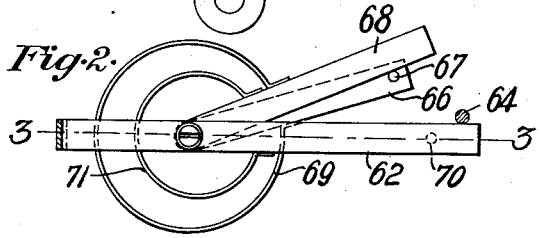
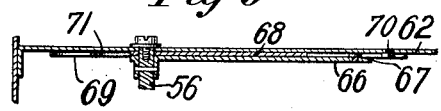
Witnesses:
Inventors:
Edgar H. Bristol,
Watson E. Goodyear,
by Emery & Booth Atty.

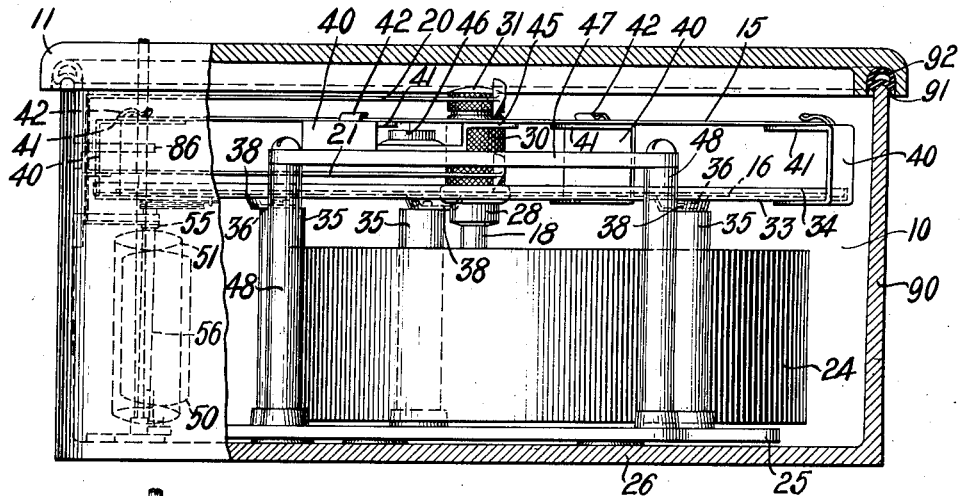
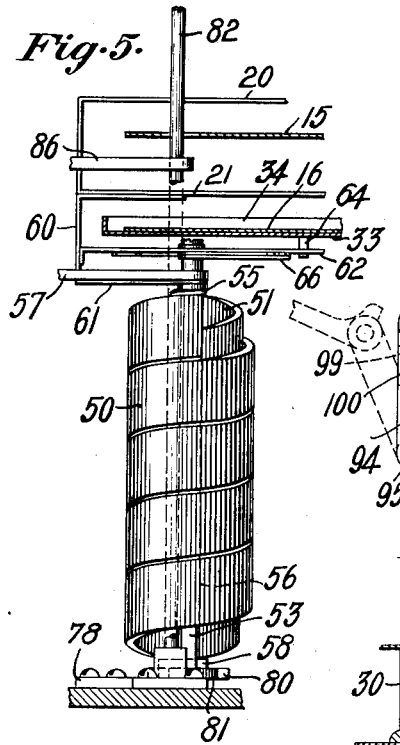
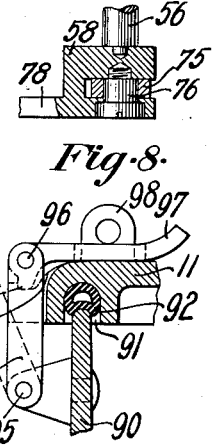
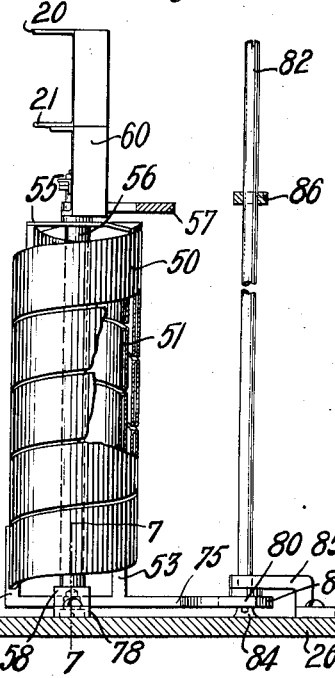

UNITED STATES PATENT OFFICE.

EDGAR H. BRISTOL AND WATSON E. GOODYEAR, OF NAUGATUCK, CONNECTICUT, ASSIGNORS TO THE INDUSTRIAL INSTRUMENT COMPANY, OF WATERBURY, CONNECTICUT, A CORPORATION OF CONNECTICUT.

MEASURING OR CONTROLLING INSTRUMENT.

1,060,812. Specification of Letters Patent. Patented May 6, 1913.

Application filed May 7, 1908. Serial No. 431,468.

*To all whom it may concern:*

Be it known that we, EDGAR H. BRISTOL and WATSON E. GOODYEAR, both citizens of the United States, and residents of Naugatuck, in the county of New Haven and State of Connecticut, have invented an Improvement in Measuring or Controlling Instruments, (Case G,) of which the following description, in connection with the accompanying drawings, is a specification, like letters on the drawings representing like parts.

This invention relates to that class of instruments wherein one or more elements responsive to changes in temperature, pressure or the like, is or are used to perform some desired indicating, recording or other office.

More particularly the invention pertains to an instrument of the class suggested, arranged to perform a plurality of like operations, as to make duplicate records.

To illustrate one practicable mode of utilizing the features of the invention, the same will be described herein as embodied in a thermo-responsive instrument, constructed, in a preferred form, to make duplicate records of temperatures upon two suitable charts.

It is to be understood that the invention is not limited to the specific construction and organization illustrated in the drawings; nor to the specific operation and use described herein for exemplification.

In the drawings: Figure 1 is a plan view of an instrument embodying the invention, suitably incased, parts of the case being broken away to disclose its interior; Fig. 2, an enlarged detached detail plan of certain parts hereinafter referred to; Fig. 3, a section on the line 3—3 of Fig. 2; Fig. 4, a side elevation, viewed from the right in Fig. 1, of the instrument shown in said figure, part of the casing being broken away; Fig. 5, an enlarged side elevation of certain parts similarly shown by dotted lines in Fig. 4; Fig. 6, a side elevation, viewed from the left in Fig. 5, of the parts shown in said figure; Fig. 7, a detached detail section on the line 7—7 of Fig. 6; Fig. 8, a detached detail section on the line 8—8 of Fig. 1; and Fig. 9, a detached detail section on the line 9—9 of Fig. 1.

Referring to Fig. 1, the illustrative instrument may be inclosed in a suitable casing 10, having a lid 11 which may be opaque, as illustrated—being composed of a casting—or may have a transparent pane set therein. The lid 11 may be hinged to the casing 10 at 12, or may be otherwise attached thereto in any practicable manner. To provide a plurality of records the illustrative instrument may have two charts 15, 16, graduated as desired and mounted upon and rotated by a spindle 18, connected to a time train such as a clock movement (not shown). With such an arrangement units of angular movement of the charts 15, 16 may serve graphically to represent periods of time. A pair of indices or pointers, in the illustrative instance pen indices 20, 21, suitably mounted and driven as presently described, may be arranged to travel in a generally radial direction over the charts 15, 16 respectively, in order to indicate or record thereon, in duplicate, a temperature prevailing at or during any instant or period of time. A preferred manner of mounting or supporting the charts 15, 16 will be first described. A drum 24, indicated in Figs. 1 and 4, may contain the time train or clock mechanism, the spindle 18 projecting upwardly therefrom; and said drum may be secured in any suitable manner to a base plate 25, secured to the floor 26 of the casing 10.

Referring to Fig. 9—secured upon the spindle 18 is a collar 28, upon the top of which may rest the chart 16. A reduced portion of the collar 28 is threaded to receive a nut 30 which, when in position, may clamp the chart 16 against the collar 28. The upper face of the nut 30 supplies a rest for the chart 15, which may be clamped in position by a second nut 31 threading upon a reduced part of the nut 30. By this means both charts are readily removable. The lower chart 16 may be conveniently supported throughout as much of its surface as desired, by a plate 33 having an upturned peripheral flange 34 within which the chart may rest. The plate 33 is supported on columns 35 projecting upwardly from the base plate 25. As shown in Fig. 1, each column 35 may have a screw therein with its head spaced slightly from the top of the column. The plate 33 may have suitable apertures to be slipped over the screw heads 36, said apertures having narrowed extensions such that the slight rotation of the plate 33 after it has been introduced to position will cause the narrowed extensions to embrace the shanks of the screws and to be held in place by the screw heads, after the manner of a bayonet joint. By supplying the apertures in the plate 33 for the screw heads 36 in stamped down portions 38 of said plate, the surface of the latter is preserved free from any obstruction which might interfere with the proper seating thereon of the chart. Thus the plate 33 is readily removable, permitting access to that part of the casing beneath it. Clips 39 (Fig. 1) may be struck up from the plate 33 to overlie and guide the chart 16. To support the upper chart 15, yokes 40 may be provided; and they may be conveniently secured to the under face of the plate 33 as shown in Fig. 4. Any desired number of the yokes 40 may be supplied, the upper arms 41 thereof disposed at intervals around the periphery of the chart area serving to hold and guide the same in its rotation. If desired, clips 42 may be struck up from the yoke arms 41 to overlie the top of the chart 15. With this arrangement the respective charts may be supported at their centers by the collar 28 and the nut 30; and the lower chart is further supported by the plate 33 and the upper chart by the yoke arms 41, 41. The pen index 21 for the lower chart 16 is opposed by the supporting plate 33 so that it has a firm surface upon which to make its recording mark. It is desirable to provide a similar opposing support disposed radially beneath the upper chart 15, to co-operate with the pen index 20. Such a support may be provided by a platform 45, shown in plan in Fig. 1. Said platform is preferably mounted on a friction pivot 46, the latter having its support upon a bracket 47 secured to columns 48 projecting upwardly from the face plate 25. In the illustrative instrument the pen indices are pivoted on a shaft 56 (Fig. 1) and travel in a generally radial direction relative to the charts 15, 16 on an arc centered at the shaft 56. Accordingly, to support the chart 15 throughout such travel as the index 20 may have, the platform 45 may be shaped on an arc. The platform 45 is preferably rotatable about its pivot 46, to permit its being rocked to one side to facilitate removal of the lower chart 16. When in the operative position shown in Fig. 1, the free end of the platform 45 may abut against the nut 30.

The preceding description has disclosed a construction which in many particulars is desirable for use in an instrument employing two charts. As will be understood, each chart is effectively mounted, and guided if it have movement, and is properly supported to oppose the pen indices. Also, the charts are both easily removable and replaceable. The described features of construction are, of course, variously applicable to instruments of different kinds, as will appear to those skilled in the art.

The specific instrument shown in the drawings is more particularly intended as a thermometer, such as might be employed in refrigerator cars or in analogous situation, requiring a plurality of charts or the like presenting preferably identical records of temperature conditions. For the purposes of the specific instrument, therefore, a thermo-responsive element is employed, as exemplified (Figs. 5 and 6) by one or more helical tubes 50, 51. In the specific instance two tubes 50 and 51 are employed, one preferably being nested within the other, and both being wound in the same direction so as to have cumulative action. Each of the tubes 50 and 51 may be sealed at both ends and may be completely filled with a suitable fluid, such for instance as alcohol. As illustrated in Fig. 6, the adjacent lower ends of the tubes 50 and 51 may be fixed normally to brackets 52, 53, these ends of the tubes being thereby held against rotation. Preferably the tubes are so associated that their adjacent extremities stand diametrically opposite, thus, at the upper ends of the tubes, supplying convenient points of attachment for a diametrically disposed strut 55. The latter preferably intersects the axis of the helix of the tubes and is rigidly attached at its opposite ends, as by soldering, to the ends of the tubes. When so assembled, a rise in temperature, causing a voluminal expansion of the fluid within the tubes 50 and 51, tends to unwind the same and thereby produces in each tube a rotary tendency about the axis of its helix. This rotary tendency is in the same direction in both tubes and, accordingly, the latter act conjointly to rotate the strut 55. A shaft 56 is appropriately mounted, preferably co-axial with the helix of the tubes, and passing through the strut 55 which may be rigidly secured to the shaft as by soldering. Thus any rotation of the tubes is communicated to the shaft 56 through the strut 55. Said shaft 56 is preferably firmly journaled at separated parts, as in a bracket 57 at its upper end and in a bracket 58 at its lower end.

The pen indices may be associated in any practicable manner with the shaft 56 to be governed thereby. Preferably, however, for the purposes of the specific instrument, the pen indices are arranged to be operated by the shaft 56 through only a part of the movement of which the latter is capable within the total range of expansion and contraction of the tubes 50 and 51. For instance, in a refrigerator car it may be desired to record those temperatures only above a certain degree. It may be desired that the temperature of a car be maintained always below freezing point, or 32° Fahrenheit; and if a lower temperature be maintained a record thereof might be superfluous. If, however, the temperature ever exceeds the intended maximum of 32° the record should indicate the fact. If desired, the record of the instrument may extend from say 30° upwardly, while it may be within the capacity of the thermo-sensitive element to indicate a much lower temperature than 30. Thus by providing between the responsive member and indices, a connection to be effective in response to temperatures above the minimum to be recorded, and to be ineffective below said minimum, the responsive member may answer to any low temperature without the same being necessarily recorded. This permits the minimum temperature graduation on the chart to be placed at one radial extremity of the latter with graduations extending therefrom to the other extremity, without requiring any of the chart for undesired records. Thereby the graduations may be given maximum spacing with consequent greater delicacy of measurement.

Conditions such as have been suggested are provided for conveniently by the organization of the illustrative machine, in which the indices 20 and 21 may be formed integral, as illustrated in Fig. 5, and may be secured as by soldering to the upper arm of a yoke 60, having its lower arm 61 suitably apertured to fit rotatively upon the shaft 56. Still another arm 62, fixed to the yoke 60, is loosely mounted on the shaft 56. Thus the yoke 60 carrying the indices 20 and 21 is free to rotate about the shaft 56, except for governing devices about to be described.

Referring now to Figs. 2 and 3, the arm 62 is shown in plan view in the position which it assumes upon contacting with a stop 64 projecting downwardly as shown in Fig. 5 from the plate 33. This stop is so placed that when the arm 62 is in the position determined thereby the pen indices will be properly located on the charts to indicate the lowest temperature to be recorded. Thus said stops 64 may prevent further movement of the pen indices to indicate a lower temperature. Fixed upon the shaft 56 is a motor arm 66, having therein a pin 67 arranged to engage an auxiliary arm 68 loosely mounted upon the shaft. A spring 69 attached as by soldering at its opposite ends to the motor arm 66 and auxiliary arm 68, respectively, tends to hold the pin 67 in contact with the arm 68. As the motor arm 66 is rocked contra-clockwise in Fig. 2 (as a result of decreasing temperature in the specific instance) the pin 67 will propel the arm 68 in the same direction, the index controlling arm 62 remaining undisturbed.

Said arm 62 has a pin 70 arranged to engage the auxiliary arm 68 when the latter moves clockwise in Fig. 2. Therefore, upon a rise in temperature, as the motor arm 66 rotates clockwise in Fig. 2, the auxiliary arm 68 follows it up, under the influence of the spring 69, and presently contacts with the pin 70 on the index controlling arm 62. A spring 71, attached as by soldering at its opposite ends to the auxiliary arm 68 and index controlling arm 62, respectively, tends to hold the arm 68 in contact with the pin 70. Thus the motor arm spring 69, causing the auxiliary arm to follow up clockwise movement of the motor arm, serves in conjunction with the second spring 71 to cause the auxiliary arm 68 to propel the index controlling arm 70 clockwise in Fig. 2, thereby causing the indices to record the temperature above the minimum at which the stop 64 is effective; and (of course within limits) this clockwise movement may cause the index controlling arm and the indices to partake of the full movement of the thermo-sensitive members 50 and 51 throughout a maximum rise in temperature.

Obviously, in an instrument intended for different uses the stop device 64 could be so placed as to prevent action on the indices beyond an appointed maximum, instead of a minimum as illustrated; and to coöperate with this arrangement, the relations of the motor and auxiliary arms and the arm 62 might be reversed. Moreover, two stop devices such as the stop 64 might be used, to limit movement of the indices both upon a rise and a fall of temperature.

In an instrument such as has been described it may be necessary at times to adjust the apparatus to suit different charts,— for instance when different minimum temperatures are to be recorded on different charts. Such adjustment may be required for other purposes, and may be effected by means of apparatus shown in Figs. 1, 5 and 6. In making such an adjustment it may not be desired to change the prevailing relations between the thermo-sensitive element and the indices, but to shift the whole temperature responsive system so that a given temperature will be properly recorded at a different place on the chart. This result may be attained by adjustably mounting the thermo-sensitive element itself as by having the brackets 52 and 53 of the tubes 50 and 51 mounted upon a movable base 75, preferably adjustable about the axis of the shaft 56 so that the indices may maintain their paths of travel on the charts in desired arcs in spite of the adjustments along said paths.

Referring now to Figs. 6 and 7, the brackets 52 and 53 supporting the lower ends of the tubes may be integral with the base 75 and the latter may be pivoted upon a stud 76 mounted in a bracket 78 fixed upon the floor 26 of the casing 10, the shaft 56 being journaled in a part 58 thereof. An end 80 of the base 75 is preferably bifurcated to embrace between its arms an adjusting device such as an eccentric 81, pivoted on a shaft 82, the latter extending upwardly as indicated in Fig. 6, so as to be accessible from the top or face of the casing 10. The shaft 82 may have a slotted head, to be engaged by a screw driver. The stud 76 shown in Fig. 7 may serve as a clamp screw to clamp the base 75 firmly between the opposite arms of the bracket 78 so as to apply friction to said base 75 and hold it securely in adjusted position, to which it may be moved by rotating the shaft 82, turning the eccentric 81 and thereby moving the base 75 about its pivot on the stud 76. The lower end of the shaft 82 may be suitably stepped in a socket 84, projecting upwardly from the floor of the casing and may be journaled in a bracket 85. Its upper end may be journaled in any practicable manner if desired in a bracket 86 projecting inwardly from a side wall of the casing 10.

It is sometimes desired that the working parts of an instrument of the class described be inclosed in an air tight receptacle capable of excluding changes in atmospheric pressure. For example, in a thermometer a thermo-sensitive device may be employed which would also be responsive, more or less, to barometric changes. By providing an air tight inclosure the barometric changes may be substantially eliminated and errors attributable thereto avoided. This may be effected as illustrated in Fig. 8, by making provision for substantially air tight closure between the side walls 90 of the casing and the lid 11. The latter may have near its periphery a recess 91 containing preferably resilient packing 92, such, for instance, as a rubber tube. When the lid 11 is closed it may inclose more or less in the recess 91 the upper edge of the side wall 90, the latter abutting against the packing 92 and making a snug closure therewith. Means for holding the lid closed may be provided as illustrated in Fig. 8, in which a bifurcated link 94 is pivoted at 95 upon an ear projecting from the wall of the casing.

Pivoted at 96 between the bifurcations of the link member 94 is a latch member 97, which may be in the form of a hasp to straddle a projecting lug 98 apertured to receive a padlock or fastening pin. Preferably integral with the latch member 97 is a toe 99 to coöperate with a cam surface 100 supplied on a projection from the lid 11. The coöperation of these specific parts is such that when the latch member 20 is rocked from dotted line position in Fig. 8 to full line position, the toe 99 will force downwardly (through the cam surface 100) the lid 11, causing it to make tight closure with the side walls 13. While the above described closure is desirable in some instances, the invention is by no means limited thereto.

While a thermo-responsive instrument has been described hereinbefore for purposes of illustration, the invention is not essentially limited thereto. On the contrary, except where otherwise indicated by the context of the claims, the invention is to be considered applicable to any uses to which it may be practicably applied. Also, the specific construction and organization disclosed for illustration may be variously changed and modified as will appear to those skilled in the art. It is not indispensable that all the features of the invention be used conjointly, since they may be used to advantage separately. For convenience, in some of the subjoined claims the expression "working device" will be used to designate a governed or actuated element of the instrument, such for example, as is exemplified by the shaft 56 or one of the indices 20, 21.

Claims.

1. In a recording thermometer, the combination of a thermo-responsive member comprising a plurality of nested cumulatively-acting tubes; a shaft governed by the responsive member; a plurality of rigidly connected pen indices mounted rotatively on the shaft; means to connect the pen indices yieldingly to the shaft for governing the former; a stationary stop to limit the movement of the indices; a plurality of rotatable charts to coöperate with the pen indices respectively; means to support said charts removably; and means to sustain part of each chart against the action of its pen index.

2. In a recording thermometer, the combination of a thermo-responsive member; a shaft governed by said member; a plurality of rigidly connected pen indices mounted rotatively on the shaft; means to connect the pen indices to the shaft for governing the former; a plurality of rotatable charts to coöperate with the pen indices respectively; means to support said charts removably; and means to sustain part of each chart against the action of its pen index.

3. In a recording thermometer, the combination of a thermo-responsive member; a plurality of rigidly connected pen indices; means to connect the pen indices yieldingly to said member for governing the indices; means to limit the movement of the indices; a plurality of charts to coöperate with the pen indices respectively; and means to sustain part of each chart against the action of its pen index.

4. In a recording thermometer, the combination of a thermo-responsive member; recording means; a plurality of record-receiving means; and supports for the same, including a supporting device for one of said means movable to facilitate access to the other.

5. In a recording thermometer, the combination of a casing; a thermo-responsive member comprising nested, cumulatively-acting helical tubes; a shaft disposed along the axis of the helix and governed by the tubes; a movable base supporting the tubes, having a bifurcated arm; a pivot for the base co-axial with the helix and said shaft; an eccentrically pivoted disk between the bifurcations of the base; an operating shaft for the disk extending to an opening in the casing; a pen index mounted rotatively on the shaft; means to govern the index yieldingly from the shaft; and a chart to coöperate with the pen index to receive a record therefrom.

6. In an instrument of the class described, the combination of a plurality of nested, cumulatively-acting, helical responsive tubes; and a working device governed thereby.

7. In an instrument of the class described, the combination of a plurality of nested helical tubes wound in the same direction; and a working device governed thereby.

8. In an instrument of the class described, the combination of a plurality of nested helical responsive members having one end of each stationary; and a working device governed thereby.

9. In an instrument of the class described, the combination of a plurality of helical responsive members having coöperating ends spaced substantially diametrically apart; and a working device governed thereby.

10. In an instrument of the class described, the combination of a pair of helical responsive members having free ends spaced substantially diametrically apart; means rigidly connecting said ends; and a working device governed by said members.

11. In an instrument of the class described, the combination of a helical responsive member; a shaft extending therethrough; means to journal the shaft at separated parts thereof; and means to hold both ends of the helical member in fixed relation to the axis of the shaft.

12. In an instrument of the class described, the combination of helical responsive means; a strut disposed diametrically relative to said means; a working device; and means to govern the latter from said strut.

13. The combination with the working parts of an instrument of the class described, of a casing therefor having a lid, yielding packing between the lid and casing and latching means to hold the packing compressed between the lid and casing.

In testimony whereof, we have signed our names to this specification, in the presence of two subscribing witnesses.

EDGAR H. BRISTOL.
WATSON E. GOODYEAR.

Witnesses:
BENNET B. BRISTOL,
WILLIAM SCHULZ.